(12) United States Patent
Paranchych et al.

(10) Patent No.: US 6,907,018 B1
(45) Date of Patent: Jun. 14, 2005

(54) METHOD AND SYSTEM FOR INITIAL POWER MANAGEMENT FOR DATA BURSTS IN CDMA SYSTEMS

(75) Inventors: David W. Paranchych, Richardson, TX (US); Ashvin H. Chheda, Plano, TX (US)

(73) Assignee: Nortel Networks Limited, St. Laurent (CA)

(*) Notice: Subject to any disclaimer, the term of this patent is extended or adjusted under 35 U.S.C. 154(b) by 920 days.

(21) Appl. No.: 09/687,796

(22) Filed: Oct. 13, 2000

(51) Int. Cl.$^7$ ................................................. H04Q 7/00
(52) U.S. Cl. ........................................................ 370/332
(58) Field of Search ................................. 370/331–337, 370/342–349, 228; 455/436–442, 522, 69, 70, 554.2, 557, 450, 452.2; 375/219–223, 130, 340, 225, 343

(56) References Cited

U.S. PATENT DOCUMENTS

| | | | | |
|---|---|---|---|---|
| 6,097,965 A | * | 8/2000 | Honkasalo et al. | 455/452.2 |
| 6,148,208 A | * | 11/2000 | Love | 455/442 |
| 6,173,162 B1 | * | 1/2001 | Dahlman et al. | 455/69 |
| 6,366,779 B1 | * | 4/2002 | Bender et al. | 455/450 |
| 6,418,161 B1 | * | 7/2002 | Shively et al. | 375/222 |
| 6,434,367 B1 | * | 8/2002 | Kumar et al. | 455/70 |
| 6,542,756 B1 | * | 4/2003 | Kim | 370/342 |
| 6,587,447 B1 | * | 7/2003 | Wang et al. | 370/335 |
| 6,690,944 B1 | * | 2/2004 | Lee et al. | 455/522 |

OTHER PUBLICATIONS

Salim Manji et al, Power Control and Capacity Analysis for a Packetized Indoor Multimedia DS–CDMA Network, May 2000, IEEE Vehicular Technology, vol. 49, Issue 3, pp. 911–935.*

Ling Qiu et al, Study on Wideband CDMA Modulation Power Control and Wireless Access for CDMA Multimedia Systems, Sep. 1999, IEEE Vehicular Technology Conference, vol. 5, pp. 2944–2948.*

Zhao Liu et al, Interference Issues in Multi–Code CDMA Networks, May 1996, IEEE International Symposium, vol. 1 pp. 98–102.*

Mine Kalkan, Optimal Rate and Power Allocation in Portable Communication Networks, Jul. 1995, IEEE 45th, vol. 2, Issue 1, pp. 579–583.*

* cited by examiner

*Primary Examiner*—Chi Pham
*Assistant Examiner*—Prenell Jones
(74) *Attorney, Agent, or Firm*—Carr LLP

(57) ABSTRACT

A method for optimizing power management in the transmittal of a variable rate data transfer between two wireless stations, such as a Base Station Transceiver and a Mobile Station. This is achieved by determining the initial power and the initial signal-to-noise values based on the reliability of the transmission, the desired data transfer rate, the power required to transmit a fixed rate message, and the frame error rates. By the use of this invention, the capacity of a desired system and/or quality of a service provided by a desired system may be enhanced.

97 Claims, 2 Drawing Sheets

US 6,907,018 B1

METHOD AND SYSTEM FOR INITIAL POWER MANAGEMENT FOR DATA BURSTS IN CDMA SYSTEMS

TECHNICAL FIELD

The invention relates generally to wireless telecommunications and, more particularly, to determining the power requirements for transmitting variable rate data transfers over a wireless interface.

BACKGROUND

Data transfers to and from users are becoming an increasingly important and used feature of Code Division Multiple Access (CDMA). Users of wireless devices, such as wireless phones and wireless laptops, are using the devices to receive and transfer large amounts of data, including documents, web pages, and e-mail. As demand for this feature grows, however, existing network elements and equipment are pushed to their limits. One particular problem with data transfers is the management of the limited amount of power available for CDMA users.

CDMA is a low-powered technology that ensures quality by utilizing a broad spectrum broadcast. A typical wireless communications network consists of a Base Station Controller (BSC) connected to at least one Base Transceiver Station (BTS). Each BTS comprises a radio antenna, with at least one sector, but typically three. Each sector is capable of transmitting to and receiving from a plurality of Mobile Stations (MSs), which consists of wireless devices such as wireless phones or wireless laptops. The number of users that any given sector is capable of supporting at any moment is dependent, among other things, the amount of power available to the BTS.

A BTS has a limited amount of power for transmitting within any sector, typically 12–18 Watts (W). Out of the total amount of power available, a reserve, typically 25%, is normally allocated to overhead and is not available to users. The remaining power is available to users for voice and data communications.

Under prior standards, such as IS-95, whether or not the BTS had sufficient power to complete the transfer was easily determined. Transfers, both voice and data, were performed over a single channel, the Fundamental Channel (FCH), at a fixed transfer rate of either 9.6 or 14.4 kilobits per second (kbps). Since the average amount of power required per sector to transmit at a given rate to any two users is approximately equal, every channel had approximately the same power requirement. To determine the amount of power required, the BSC would simply calculate the average power per FCH by dividing the total amount of power consumed by existing FCH users, by the number of FCH users. If the sector had sufficient power available for the new user, the transfer would be initiated. Otherwise, the transfer would be rejected.

Until the advent of IS-2000, multiple FCH channels were allocated to a single user to achieve a faster rate of transfer. IS-2000, however, provides variable rate data transfers within a single channel. Users are still allocated a fixed 9.6 kbps FCH but are also allocated a variable rate Supplemental Channel (SCH). The SCH is capable of transmitting data at rates of 9.6–307.2 kbps. The optimum power level, however, varies with the data transfer rate. Therefore, the method used to predict the availability of power used for IS-95 systems is not suitable for IS-2000 systems. The amount of power required by the SCH must be adjusted to prevent an inefficient use of the available power.

Another problem with IS-2000 is that the BSC must set the initial target signal-to-noise ratio, referred to as $E_b/N_0$, where $E_b$ represents the energy per information bit and $N_0$ represents the power spectral density of interference. This value is used to initialize an outer power control loop at the mobile station (MS). The outer power control loop is a mechanism, commonly known in the art, in which the MS continually updates the target $E_b/N_0$, which is used in the inner power control loop to compare to the measured $E_b/N_0$. The comparison is used to generate fast power control feedback. This method is used to achieve the optimum amount of power without creating undue interference to other users or experiencing an unacceptable level of frame errors.

If the initial $E_b/N_0$ is not set correctly, inefficiencies will result. First, if the initial $E_b/N_0$ is set too large, the BTS will send the data with too much power. This results in wasted power (less available power to other users) and interference (increased power of one user increases power of another user in order to overcome interference introduced by the first user) to other users. Second, if the initial $E_b/N_0$ is set too small, the transmission will be delayed as the power will not be sufficient for the MS to receive, or the user will experience a series of frame errors until the power is raised to a sufficient level.

Therefore, what is needed is a method for analyzing the initial power requirements for a given data transfer request and initializing the outer power control loop, thereby allowing for greater efficiencies and increased capacity in the system.

SUMMARY

The present invention comprises a method and system for determining the initial power and signal-to-noise values for the transmittal of a variable rate data transfer over a wireless interface. This is achieved by determining the initial power and the initial signal-to-noise values based on the reliability of the transmission, the desired data transfer rate, the power required to transmit a fixed rate message, and the frame error rates. By the use of this invention, the capacity of a desired system and/or quality of a service provided by a desired system may be enhanced.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
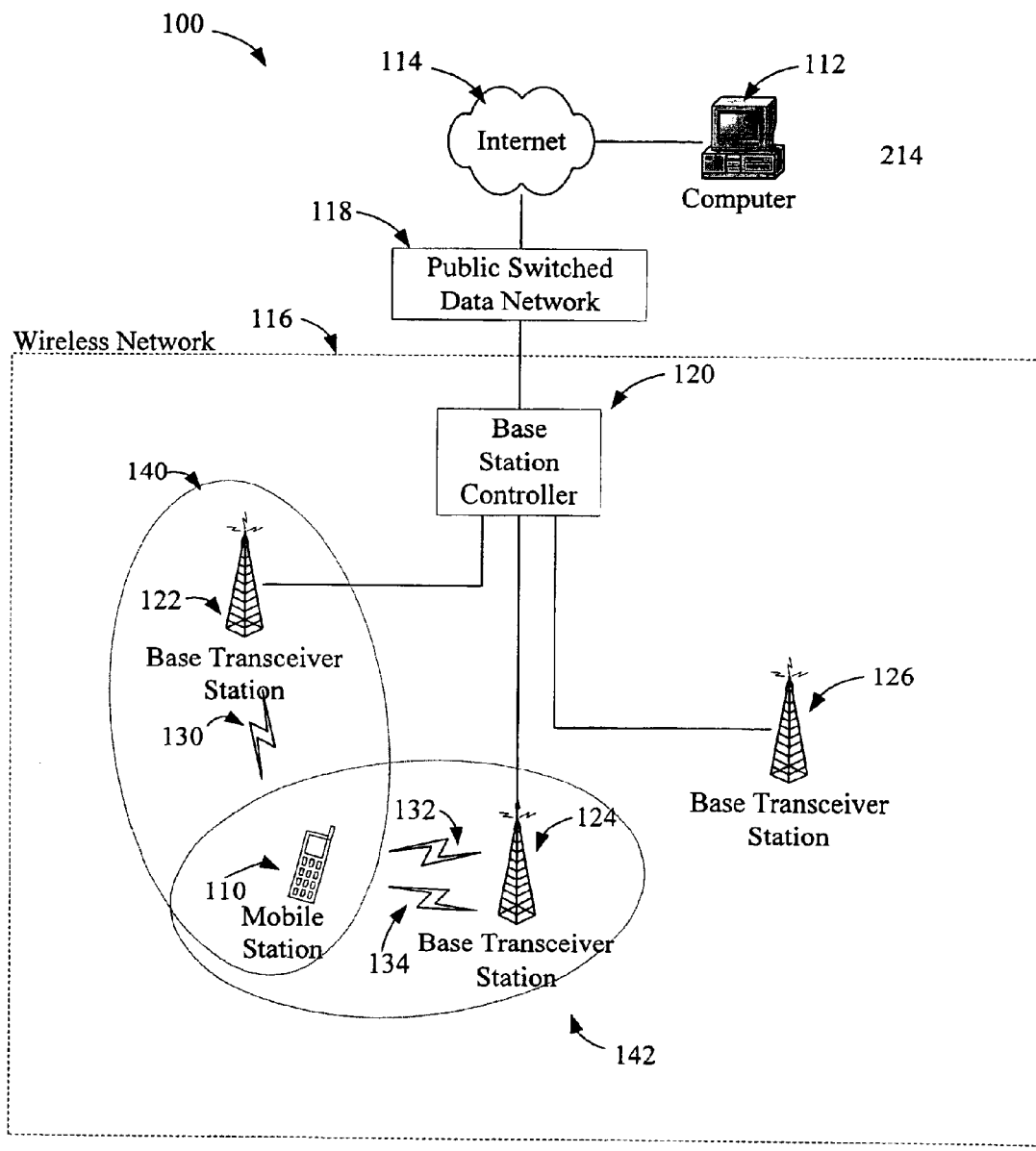
FIG. 1 depicts an embodiment of a network employing the present invention.
Figure 2:
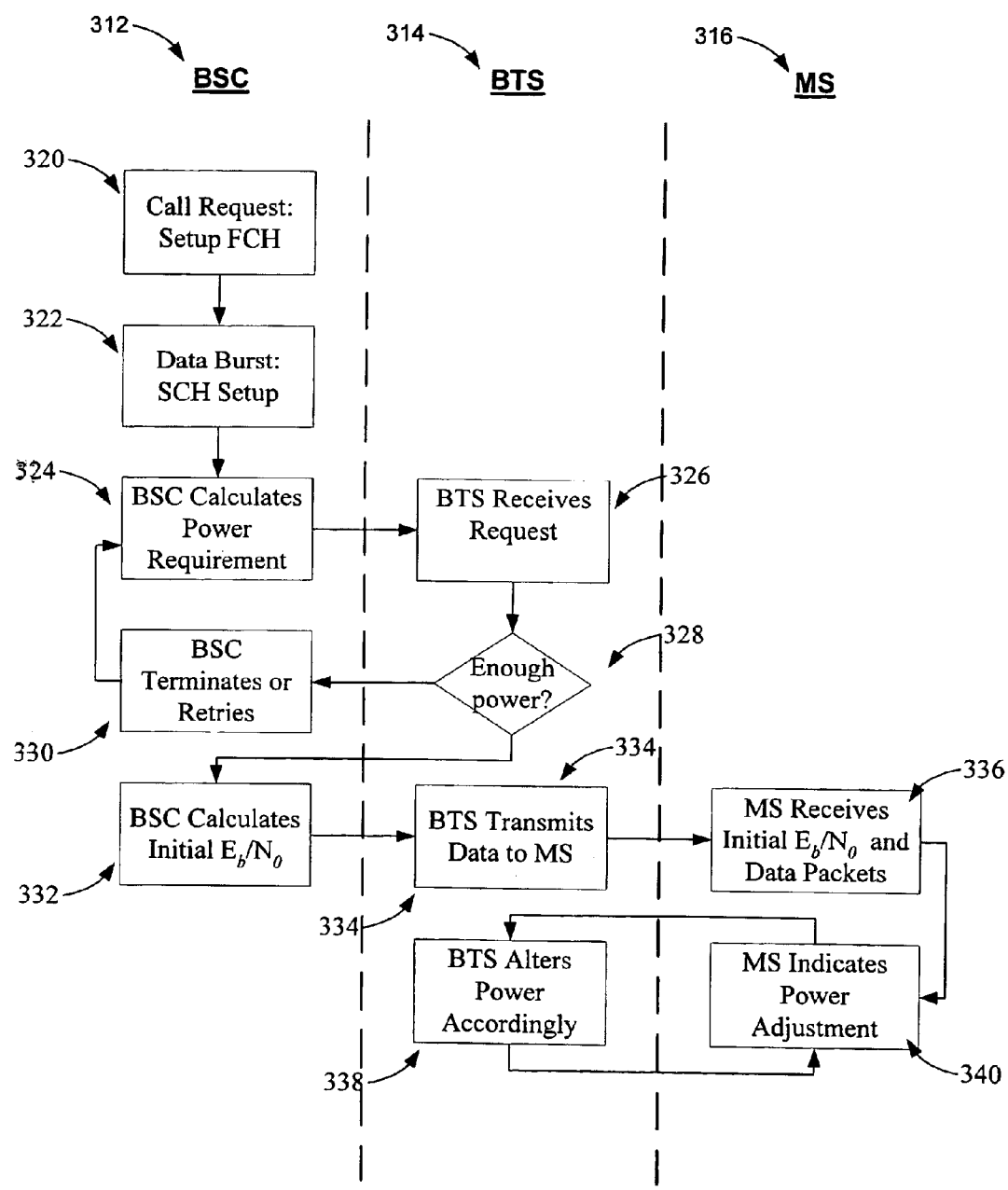
FIG. 2 is a flow chart illustrating one embodiment of a process employing the present invention.

The principles of the present invention and their advantages are best understood by referring to the illustrated embodiment depicted in FIGS. 1–2.

Referring now to FIG. 1 of the drawings, reference numeral 100 illustrates a typical wireless communications network in which the present invention operates. From the user's perspective, communication, voice or data, occurs between a first user on a Mobile Station (MS) 110 and a second user 112. For data communications, the second user 112 is generally connected via the Internet 114. While the present invention is particularly useful for data transfers of this kind, other methods of connectivity and types of transfers are not to be excluded. The present invention is useful for any type of transfer with a Radio Frequency (RF) signal, where the rate of transfer is variable.

Access from the Internet 114 to the wireless network 116 is through a Packet Data Serving Node (PDSN) 118. The PDSN 118 provides a switching mechanism for high-speed data packets. Connectivity from the PDSN 118 to the wireless network is through a Base Station Controller (BSC) 120. The BSC 120, among other things, controls and manages associated Base Transceiver Stations (BTSs) 122, 124, and 126.

The MS 110 communicates to the BTSs 122, 124, and 126 via Code Division Multiple Access (CDMA) technology over RF links 130, 132, and 134. Wireless communications and CDMA technology is well known in the art and will not be described in further detail, except insofar as necessary to describe the present invention.

Moreover, each MS 110 may communicate simultaneously with multiple BTSs 122 and 124, as illustrated by the active cells 140 and 142. BTSs 122 and 124 actively communicating with the MS 110 are known as the active set. Depending on the BTS design, it is possible that each cell served by a particular BTS can be further sectorized. Therefore, one BTS can serve multiple sectors in the same cell. This is known as sectorization to those skilled in the art. Hence, it is also possible that an active cell 142 may be in communication with an MS 110 in multiple sectors within cell 142, as indicated by the RF links 132 and 134.

Within this framework, the second user 112 initiates a typical data transfer. The data transfer request is passed through the Internet 114 and the PDSN 118 to the BSC 120. Upon receiving the data transfer request, the BSC 118 determines, through an inquiry to the BTS 124 whether the BTS 124 is capable of handling the request. If the BTS 124 is capable of handling the request, the BSC 120 allows the transfer to continue to the MS 110. Otherwise, the BSC 120 holds the request in a queue for transmission at a later time, or, optionally, transmits the data at a lower data transfer rate that would require less power.

The above transfer is further illustrated in the data flow diagram of FIG. 2. The initial step 320 involves the arrival of a call request at the BSC 312. At this point the BSC 312 initializes the FCH channel by allocating a channel for communication between the BTS 314 and the MS 316. The setup of the FCH is well known in the art and will not be discussed in further detail.

After the FCH is initialized, a data transmission request arrives. The data transmission request may require the allocation of an SCH to the MS 316 for a variable rate data transfer, as indicated in step 322. The allocation of an SCH depends on whether the outcome of steps 324, 326, 328, and 330 indicate that the BTS has sufficient power. In step 324, the BSC 312 estimates the power required for the data burst. The power required for the transmission of the SCH is calculated as follows:

$$P_{SCH} = P_{FCH} + 10 \log_{10}(R_{SCH}/R_{FCH}) + \text{Reduced Active Set Correction}(N_{FCH}, N_{SCH}) + \text{FER Correction}(FER_{SCH}, FER_{FCH})$$

Each of the terms in the above calculation will be described in detail in the following paragraphs.

$P_{FCH}$ is a baseline value for the power required to communicate with the MS at a given transfer rate. When applying CDMA IS-2000 standards, the average power of the FCH is used as an estimate of the value to be assigned this term.

The $10 \log_{10}(R_{SCH}/R_{FCH})$ reflects that the power required is approximately proportional to the data transfer rate. Accordingly, in the present case, $R_{SCH}/R_{FCH}$ is the ratio of the desired data rate of the SCH ($R_{SCH}$) to the desired data rate of the FCH ($R_{FCH}$). The remainder of the term, $10 \log_{10}$, converts the ratio to decibels (dB).

The Reduced Active Set Correction term reflects that, in general, required power for a channel increases as the size of its active set decreases. An MS can receive data simultaneously from multiple BTSs or sectors, creating a set of communication links or legs commonly referred to as an active set of communication links. If one of the legs of the active set fails, the MS is capable of receiving data on any of the remaining legs in the active set. This concept is commonly known as diversity gain by those skilled in the art.

In IS-2000, the SCH active set can be a subset of the FCH active set. This was enabled to limit cost of high speed channel hardware resources at the BTSs, and to reduce interference to other users. Therefore, when an SCH link is established with fewer legs than the FCH to the same user, the data transfer is more error-prone if a leg fails and there must be a correction factor to account for the increase in required power.

TABLE 1 indicates the approximate values that are preferred for the Reduced Active Set Correction term based on the number of active FCH legs and the number of active SCH legs, as determined by empirical data.

TABLE 1

| $N_{FCH} \backslash N_{SCH}$ | 1 | 2 | 3 | 4 | 5 | 6 |
|---|---|---|---|---|---|---|
| 1 | 0.0 | — | — | — | — | — |
| 2 | 3.0 | 0.0 | — | — | — | — |
| 3 | 5.0 | 1.8 | 0.0 | — | — | — |
| 4 | 5.0 | 1.8 | 0.0 | 0.0 | — | — |
| 5 | 5.0 | 1.8 | 0.0 | 0.0 | 0.0 | — |
| 6 | 5.0 | 1.8 | 0.0 | 0.0 | 0.0 | 0.0 |

The next term, the FER Correction, reduces the required power as the Frame Error Rate (FER) is increased. The FER Correction is calculated as follows:

$$\text{FER Correction}(FER_{SCH}, FER_{FCH}) = \text{FER Correction Slope} * \log_{10}(FER_{SCH}/FER_{FCH})$$

The preferred FER Correction Slope is calculated such that a ratio of the frame error rate of the SCH to the frame error rate of the FCH of 2 will yield a decrease in the required power of 1 dB. As a result, the FER Correction Slope is (−3.3). Empirical tests indicate that these values create preferable results, however, different slopes may be used to obtain better results in various circumstances.

The preferred $\log_{10}(FER_{SCH}/FER_{FCH})$ is the ratio of the forward frame error rate of the supplemental channel to the forward frame error rate of the fundamental channel, converted to decibels.

An enhancement of the estimated $P_{SCH}$ is the addition of a Code Correction term that accounts for differences of error correction methods designed into the RF standard. For the case of IS-2000, error correction, known as channel coding, may use either turbo codes or convolutional codes. The code correction term is zero when convolutional codes are used. When turbo codes are used, however, the power requirements are less than that required when convolutional codes are used as the data rate increases, i.e. the relationship between the required power and the data transfer rate is non-linear. TABLE 2 indicates the approximate values that are preferred for the turbo code corrections for Radio Configurations RC3 and RC4.

TABLE 2

| Rate (kbps) | RC3 | RC4 |
| --- | --- | --- |
| 19.2 | −0.6 | −0.1 |
| 38.4 | −1.0 | −0.5 |
| 76.8 | −1.2 | −0.8 |
| 153.6 | −1.4 | −1.1 |

A further enhancement of the estimated $P_{SCH}$ is the addition of a Power Control Correction term, which is a correction factor related to the superior quality of power control of the SCH over the FCH. The data rate of the SCH is known by the MS, whereas the FCH data rate may change, without notification, from frame to frame. This means that the MS may use all SCH data bits in the estimation of received signal-to-noise ratio, whereas on the FCH, the MS may use only the punctured power control bits, which are always sent at the same power level, regardless of the FCH data rate. This results in more accurate power control of the SCH than that of the FCH, and as a result of the superior power control, the SCH does not require as much power as the FCH. Based on empirical data, the value is found to be approximately (−1.0) dB.

In step 326 the BSC sends the initial power requirements to the BTS to determine if the BTS has available power for the requested data transfer. The BTS determines, in step 328, whether power is available by comparing the available power, with the initial power requirements. If the initial power requirement exceeds the available power, in step 330 the BSC can either terminate the request and notify the sender of the result, or retry the transfer at a lower transfer rate. Lower transfer rates require less power; therefore, if there was insufficient power at a higher transfer rate, there may be power sufficient for a transfer at a lower rate. As a result, the BSC may allocate an SCH for a lower data transfer rate if the power is insufficient for a higher data transfer rate, thereby completing the data transfer at a lower rate.

After the BSC calculates the initial $P_{SCH}$ estimate, the BSC, in step 332, calculates the initial $E_b/N_0$, which is used to initialize the outer power control loop illustrated in steps 338 and 340. $E_b/N_0$ represents the strength of the signal required to overcome the noise required to allow the MS to receive the signal without causing unacceptable interference with other users. The preferred $E_b/N_0$ is the level the MS receives the data at a given acceptable frame error rate (FER). To maintain effective and efficient communications, it is important to initialize $E_b/N_0$ near an acceptable error rate. If the value is too high, the signal will be too strong, power will be wasted, and interference will likely be caused with other users. If the value is too low, the MS will experience an unacceptable delay in the transmission, as the error rate will be below the acceptable level.

The initial SCH target $E_b/N_0$ is calculated as an offset ($\Delta E_b/N_0$) to the value maintained by the MS for the FCH. Under the present invention, $\Delta E_b/N_0$ is calculated:

$\Delta E_b/N_0$=Reduced Active Set Correction($N_{FCH}, N_{SCH}$)+FER Correction($FER_{SCH}, FER_{FCH}$)

As with the estimated $P_{SCH}$, a Code Correction term and a Power Control Correction term may be used to further enhance the above $\Delta E_b/N_0$ calculation.

The purpose and value for the individual terms are described above.

After the BSC calculates the $\Delta E_b/N_0$, the value is sent to the BTS in step 334. The BTS in turn sends the value to the MS and begins the data transfer at the calculated initial power setting. In step 336, the MS receives the value and the data and begins executing an inner power control loop, preferably at 400 Hz (400 power control commands per second), as illustrated in steps 338 and 340, shown for the sake of completeness. The inner power control loop is commonly known in the industry and will not be discussed in further detail.

It is understood that the present invention can take many forms and embodiments. Accordingly, several variations may be made in the foregoing without departing from the spirit or the scope of the invention. For example, the Code Correction and the Power Control Correction terms may be ignored without negating the usefulness of the above equations. The terms, though, have been found to be useful in fine-tuning the initial power requirements and the initial $\Delta E_b/N_0$, in simulations.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for determining the power required to transmit data via one or more links of a set of communication links in a wireless communications system, the method comprising the steps of:

determining a base power level of a communication link at a first data transfer rate;

adjusting the base power level of a communication link at the first data transfer rate to a second power level for a second data transfer rate for providing an approximately proportional power level at the second data transfer rate;

adjusting the second power level by an active leg adjustment to provide an acceptable signal strength for the number of communication links in the set of communication links; and modifying the second power level by a frame error correction value to provide an acceptable signal strength at a transmission frame error rate.

2. The method in claim 1, wherein the first data transfer rate is the data transfer rate of a fundamental channel (FCH).

3. The method in claim 2, wherein the base power level is the power required for transferring data on the fundamental channel (FCH).

4. The method in claim 2, wherein the base power level is a value spatially representing the power required for the first data transfer on the fundamental channel (FCH).

5. The method in claim 1, wherein the adjustment of the base power level at the first data transfer rate to a second power level at a second data transfer rate is the ratio of the second data transfer rate to the first data transfer rate converted to decibels.

6. The method in claim 1, wherein the step of adjusting the second power level by the active leg adjustment varies in magnitude as a function of the number of communication links in a set of communication links for the first data transfer rate and the second data transfer rate.

7. The method in claim 6, wherein the first data transfer rate is the data transfer rate of a fundamental channel; and wherein the second data transfer rate is the data transfer rate of a supplemental channel.

8. The method in claim 7, wherein the step of adjusting the second power level by the active leg adjustment, the magnitude of the active leg adjustment decreases as the fundamental channel comprises fewer communication links.

9. The method in claim 7, wherein the step of adjusting the second power level by the active leg adjustment, the magnitude of the active leg adjustment increases as the supplemental channel comprises fewer communication links.

10. The method in claim 7, wherein the step of adjusting the second power level by the active leg adjustment, the fundamental channel comprises between about 1 and 6 communication links, the supplemental channel comprises between about 1 and 6 communication links, and the magnitude of the active leg adjustment is between about 0.0 decibels and 5.0 decibels.

11. The method in claim 7, wherein the step of adjusting the second power level by the active leg adjustment, the fundamental channel comprises at least 1 communication link and the supplemental channel comprises at least 1 communication link; and wherein the step of adjusting the second power level by the active leg adjustment comprises adjusting the second power level approximately 0.0 decibels.

12. The method in claim 7, wherein the step of adjusting the second power level by the active leg adjustment, the fundamental channel comprises at least 2 communication links and the supplemental channel comprises at least 1 communication link; and wherein the step of adjusting the second power level by the active leg adjustment comprises adjusting the second power level approximately 3.0 decibels.

13. The method in claim 7, wherein the step of adjusting the second power level by the active leg adjustment, the fundamental channel comprises at least 3 communication links and the supplemental channel comprises at least 1 communication link; and wherein the step of adjusting the second power level by the active leg adjustment comprises adjusting the second power level approximately 5.0 decibels.

14. The method in claim 7, wherein the step of adjusting the second power level by the active leg adjustment, the fundamental channel comprises at least 4 communication links and the supplemental channel comprises at least 1 communication link; and wherein the step of adjusting the second power level by the active leg adjustment comprises adjusting the second power level approximately 5.0 decibels.

15. The method in claim 7, wherein the step of adjusting the second power level by the active leg adjustment, the fundamental channel comprises at least 5 communication links and the supplemental channel comprises at least 1 communication link; and wherein the step of adjusting the second power level by the active leg adjustment comprises adjusting the second power level approximately 5.0 decibels.

16. The method in claim 7, wherein the step of adjusting the second power level by the active leg adjustment, the fundamental channel comprises at least 6 communication links and the supplemental channel comprises at least 1 communication link; and wherein the step of adjusting the second power level by the active leg adjustment comprises adjusting the second power level approximately 5.0 decibels.

17. The method in claim 7, wherein the step of adjusting the second power level by the active leg adjustment, the fundamental channel comprises at least 2 communication links and the supplemental channel comprises at least 2 communication links; and wherein the step of adjusting the second power level by the active leg adjustment comprises adjusting the second power level approximately 0.0 decibels.

18. The method in claim 7, wherein the step of adjusting the second power level by the active leg adjustment, the fundamental channel comprises at least 3 communication links and the supplemental channel comprises at least 2 communication links; and wherein the step of adjusting the second power level by the active leg adjustment comprises adjusting the second power level approximately 1.8 decibels.

19. The method in claim 7, wherein the step of adjusting the second power level by the active leg adjustment, the fundamental channel comprises at least 4 communication links and the supplemental channel comprises at least 2 communication links; and wherein the step of adjusting the second power level by the active leg adjustment comprises adjusting the second power level approximately 1.8 decibels.

20. The method in claim 7, wherein the step of adjusting the second power level by the active leg adjustment, the fundamental channel comprises at least 5 communication links and the supplemental channel comprises at least 2 communication links; and wherein the step of adjusting the second power level by the active leg adjustment comprises adjusting the second power level approximately 1.8 decibels.

21. The method in claim 7, wherein the step of adjusting the second power level by the active leg adjustment, the fundamental channel comprises at least 6 communication links and the supplemental channel comprises at least 2 communication links; and wherein the step of adjusting the second power level by the active leg adjustment comprises adjusting the second power level approximately 1.8 decibels.

22. The method in claim 7, wherein the step of adjusting the second power level by the active leg adjustment, the fundamental channel comprises at least 3 communication links and the supplemental channel comprises at least 3 communication links; and wherein the step of adjusting the second power level by the active leg adjustment comprises adjusting the second power level approximately 0.0 decibels.

23. The method in claim 7, wherein the step of adjusting the second power level by the active leg adjustment, the fundamental channel comprises at least 4 communication links and the supplemental channel comprises at least 3 communication links; and wherein the step of adjusting the second power level by the active leg adjustment comprises adjusting the second power level approximately 0.0 decibels.

24. The method in claim 7, wherein the step of adjusting the second power level by the active leg adjustment, the fundamental channel comprises at least 5 communication links and the supplemental channel comprises at least 3 communication links; and wherein the step of adjusting the second power level by the active leg adjustment comprises adjusting the second power level approximately 0.0 decibels.

25. The method in claim 7, wherein the step of adjusting the second power level by the active leg adjustment, the fundamental channel comprises at least 6 communication links and the supplemental channel comprises at least 3 communication links; and wherein the step of adjusting the second power level by the active leg adjustment comprises adjusting the second power level approximately 0.0 decibels.

26. The method in claim 7, wherein the step of adjusting the second power level by the active leg adjustment, the fundamental channel comprises at least 4 communication links and the supplemental channel comprises at least 4 communication links; and wherein the step of adjusting the second power level by the active leg adjustment comprises adjusting the second power level approximately 0.0 decibels.

27. The method in claim 7, wherein the step of adjusting the second power level by the active leg adjustment, the fundamental channel comprises at least 5 communication links and the supplemental channel comprises at least 4 communication links; and wherein the step of adjusting the second power level by the active leg adjustment comprises adjusting the second power level approximately 0.0 decibels.

28. The method in claim 7, wherein the step of adjusting the second power level by the active leg adjustment, the fundamental channel comprises at least 6 communication links and the supplemental channel comprises at least 4 communication links; and wherein the step of adjusting the second power level by the active leg adjustment comprises adjusting the second power level approximately 0.0 decibels.

29. The method in claim 7, wherein the step of adjusting the second power level by the active leg adjustment, the fundamental channel comprises at least 5 communication links and the supplemental channel comprises at least 5 communication links; and wherein the step of adjusting the second power level by the active leg adjustment comprises adjusting the second power level approximately 0.0 decibels.

30. The method in claim 7, wherein the step of adjusting the second power level by the active leg adjustment, the fundamental channel comprises at least 6 communication links and the supplemental channel comprises at least 5 communication links; and wherein the step of adjusting the second power level by the active leg adjustment comprises adjusting the second power level approximately 0.0 decibels.

31. The method in claim 7, wherein the step of adjusting the second power level by the active leg adjustment, the fundamental channel comprises at least 6 communication links and the supplemental channel comprises at least 6 communication links; and wherein the step of adjusting the second power level by the active leg adjustment comprises adjusting the second power level approximately 0.0 decibels.

32. The method in claim 1, wherein the modification of the second power level by the frame error correction value is a function of:

$$\text{Frame Error Correction Value} = \text{FER Correction Slope} * \log_{10}(\text{FER}_{SCH}/\text{FER}_{FCH})$$

wherein the FER Correction Slope is a factor to be applied to the ratio of a supplemental frame error rate to a fundamental frame error rate converted to decibels; and wherein the term $\log_{10}(\text{FER}_{SCH}/\text{FER}_{FCH})$ is the ratio of the supplemental frame error rate to the fundamental frame error rate.

33. The method in claim 32, wherein the FER Correction Slope is approximately −3.3.

34. The method in claim 32, wherein the supplemental frame error rate is a forward supplemental channel frame error rate.

35. The method in claim 32, wherein the fundamental frame error rate is the forward fundamental channel frame error rate.

36. The method in claim 1, further comprising adjusting the second power level by an error code correction adjustment at least partially offsetting a gain achieved by a frame error correction method designed into the wireless communications system.

37. The method in claim 33, wherein the frame error correction method comprises use of a convolutional code and wherein the error code correction adjustment comprises approximately 0.0 decibels.

38. The method in claim 33, wherein:
the frame error code correction method comprises use of a turbo code;
the transmission of data comprises use of protocols with Radio Configuration 3;
the data transfer rate comprises approximately 19.2 kbps; and
the step of adjusting the second power level by an error code correction adjustment comprises a decrease of power by approximately 0.6 decibels.

39. The method in claim 33, wherein:
the frame error code correction method comprises use of a turbo code;
the transmission of data comprises use of protocols with Radio Configuration 3;
the data transfer rate comprises approximately 38.4 kbps; and
the step of adjusting the second power level by an error code correction adjustment comprises a decrease of power by approximately 1.0 decibels.

40. The method in claim 33, wherein:
the frame error code correction method comprises use of a turbo code;
the transmission of data comprises use of protocols with Radio Configuration 3;
the data transfer rate comprises approximately 76.8 kbps; and
the step of adjusting the second power level by an error code correction adjustment comprises a decrease of power by approximately 1.2 decibels.

41. The method in claim 33, wherein:
the frame error code correction method comprises use of a turbo code;
the transmission of data comprises use of protocols with Radio Configuration 3;
the data transfer rate comprises approximately 153.6 kbps; and
the step of adjusting the second power level by an error code correction adjustment comprises a decrease of power by approximately 1.4 decibels.

42. The method in claim 33, wherein:
the frame error code correction method comprises use of a turbo code;
the transmission of data comprises use of protocols with Radio Configuration 4;
the data transfer rate comprises approximately 19.2 kbps; and the step of adjusting the second power level by an error code correction adjustment comprises a decrease of power by approximately 0.1 decibels.

43. The method in claim 33, wherein:
the frame error code correction method comprises use of a turbo code;
the transmission of data comprises use of protocols with Radio Configuration 4;
the data transfer rate comprises approximately 38.4 kbps; and
the step of adjusting the second power level by an error code correction adjustment comprises a decrease of power by approximately 0.5 decibels.

44. The method in claim 33, wherein:
the frame error code correction method comprises use of a turbo code;
the transmission of data comprises use of protocols with Radio Configuration 4;
the data transfer rate comprises approximately 76.8 kbps; and
the step of adjusting the second power level by an error code correction adjustment comprises a decrease of power by approximately 0.8 decibels.

45. The method in claim 33, wherein:
the frame error code correction method comprises use of a turbo code;
the transmission of data comprises use of protocols with Radio Configuration 4;
the data transfer rate comprises approximately 153.6 kbps; and
the step of adjusting the second power level by an error code correction adjustment comprises a decrease of power by approximately 1.1 decibels.

46. The method in claim 1, further comprising adjusting the second power level by a power control adjustment at least partially offsetting a difference in a first power control of the first data transfer rate and a second power control of the second data transfer rate.

47. The method in claim 46, wherein the first data transfer rate is the data transfer rate of a fundamental channel; wherein the second data transfer rate is the data transfer rate of a supplemental channel; and wherein the power control correction adjustment comprises approximately −1.0 dB.

48. The method in claim 1, wherein the communication links are adjusted to operate over substantially the same spread spectrum.

49. The method in claim 48, wherein the communication links transfer data in a CDMA system.

50. A method for determining a $\Delta E_b/N_0$ value of one or more communications links in a set of communication links between a first target $E_b/N_0$ value of a first data transfer at a first data transfer rate and a desired target $E_b/N_0$ value of a second data transfer at a second data transfer rate, the method comprising the steps of:
determining a base $\Delta E_b/N_0$ value as an active leg value to provide an acceptable signal strength for the number of communication links in a set of communication links; and
adjusting the base $\Delta E_b/N_0$ value by a frame error correction value to provide an acceptable signal strength at a transmission frame error rate.

51. The method in claim 50, wherein the step of determining the base $\Delta E_b/N_0$ value varies in magnitude as a function of the number of communication links in the set of communication links for a first data transfer rate and a second data transfer rate.

52. The method in claim 51, wherein the first data transfer rate is the data transfer rate of a fundamental channel; and wherein the second data transfer rate is the data transfer rate of a supplemental channel.

53. The method in claim 52, wherein the step of determining the base $\Delta E_b/N_0$ value, the magnitude of the active leg value decreases as the fundamental channel comprises fewer communication links.

54. The method in claim 52, wherein the step of determining the base $\Delta E_b/N_0$ value, the magnitude of the active leg value increases as the supplemental channel comprises fewer communication links.

55. The method in claim 52, wherein the step of determining the base $\Delta E_b/N_0$ value, the fundamental channel comprises between about 1 and 6 communication links, the supplemental channel comprises between about 1 and 6 communication links, and the magnitude of the active leg value is between about 0.0 decibels and 5.0 decibels.

56. The method in claim 52, wherein the step of determining the base $\Delta E_b/N_0$ value, the fundamental channel comprises at least 1 communication link and the supplemental channel comprises at least 1 communication link; and wherein the step of adjusting the second power level by the active leg value comprises adjusting the second power level approximately 0.0 decibels.

57. The method in claim 52, wherein the step of determining the base $\Delta E_b/N_0$ value, the fundamental channel comprises at least 2 communication links and the supplemental channel comprises at least 1 communication link; and wherein the step of adjusting the second power level by the active leg value comprises adjusting the second power level approximately 3.0 decibels.

58. The method in claim 52, wherein the step of determining the base $\Delta E_b/N_0$ value, the fundamental channel comprises at least 3 communication links and the supplemental channel comprises at least 1 communication link; and wherein the step of adjusting the second power level by the active leg value comprises adjusting the second power level approximately 5.0 decibels.

59. The method in claim 52, wherein the step of determining the base $\Delta E_b/N_0$ value, the fundamental channel comprises at least 4 communication links and the supplemental channel comprises at least 1 communication link; and wherein the step of adjusting the second power level by the active leg value comprises adjusting the second power level approximately 5.0 decibels.

60. The method in claim 52, wherein the step of determining the base $\Delta E_b/N_0$ value, the fundamental channel comprises at least 5 communication links and the supplemental channel comprises at least 1 communication link; and wherein the step of adjusting the second power level by the active leg value comprises adjusting the second power level approximately 5.0 decibels.

61. The method in claim 52, wherein the step of determining the base $\Delta E_b/N_0$ value, the fundamental channel comprises at least 6 communication links and the supplemental channel comprises at least 1 communication link; and wherein the step of adjusting the second power level by the active leg value comprises adjusting the second power level approximately 5.0 decibels.

62. The method in claim 52, wherein the step of determining the base $\Delta E_b/N_0$ value, the fundamental channel comprises at least 2 communication links and the supplemental channel comprises at least 2 communication links; and wherein the step of adjusting the second power level by the active leg value comprises adjusting the second power level approximately 0.0 decibels.

63. The method in claim 52, wherein the step of determining the base $\Delta E_b/N_0$ value, the fundamental channel comprises at least 3 communication links and the supplemental channel comprises at least 2 communication links; and wherein the step of adjusting the second power level by the active leg value comprises adjusting the second power level approximately 1.8 decibels.

64. The method in claim 52, wherein the step of determining the base $\Delta E_b/N_0$ value, the fundamental channel comprises at least 4 communication links and the supplemental channel comprises at least 2 communication links; and wherein the step of adjusting the second power level by the active leg value comprises adjusting the second power level approximately 1.8 decibels.

65. The method in claim 52, wherein the step of determining the base $\Delta E_b/N_0$ value, the fundamental channel comprises at least 5 communication links and the supplemental channel comprises at least 2 communication links; and wherein the step of adjusting the second power level by the active leg value comprises adjusting the second power level approximately 1.8 decibels.

66. The method in claim 52, wherein the step of determining the base $\Delta E_b/N_0$ value, the fundamental channel comprises at least 6 communication links and the supplemental channel comprises at least 2 communication links; and wherein the step of adjusting the second power level by the active leg value comprises adjusting the second power level approximately 1.8 decibels.

67. The method in claim 52, wherein the step of determining the base $\Delta E_b/N_0$ value, the fundamental channel comprises at least 3 communication links and the supplemental channel comprises at least 3 communication links; and wherein the step of adjusting the second power level by the active leg value comprises adjusting the second power level approximately 0.0 decibels.

68. The method in claim 52, wherein the step of determining the base $\Delta E_b/N_0$ value, the fundamental channel comprises at least 4 communication links and the supplemental channel comprises at least 3 communication links; and wherein the step of adjusting the second power level by the active leg value comprises adjusting the second power level approximately 0.0 decibels.

69. The method in claim 52, wherein the step of determining the base $\Delta E_b/N_0$ value; the fundamental channel comprises at least 5 communication links and the supplemental channel comprises at least 3 communication links; and wherein the step of adjusting the second power level by the active leg value comprises adjusting the second power level approximately 0.0 decibels.

70. The method in claim 52, wherein the step of determining the base $\Delta E_b/N_0$ value, the fundamental channel comprises at least 6 communication links and the supplemental channel comprises at least 3 communication links; and wherein the step of adjusting the second power level by the active leg value comprises adjusting the second power level approximately 0.0 decibels.

71. The method in claim 52, wherein the step of determining the base $\Delta E_b/N_0$ value, the fundamental channel comprises at least 4 communication links and the supplemental channel comprises at least 4 communication links; and wherein the step of adjusting the second power level by the active leg value comprises adjusting the second power level approximately 0.0 decibels.

72. The method in claim 52, wherein the step of determining the base $\Delta E_b/N_0$ value, the fundamental channel comprises at least 5 communication links and the supplemental channel comprises at least 4 communication links; and wherein the step of adjusting the second power level by the active leg value comprises adjusting the second power level approximately 0.0 decibels.

73. The method in claim 52, wherein the step of determining the base $\Delta E_b/N_0$ value, the fundamental channel comprises at least 6 communication links and the supplemental channel comprises at least 4 communication links; and wherein the step of adjusting the second power level by the active leg value comprises adjusting the second power level approximately 0.0 decibels.

74. The method in claim 52, wherein the step of determining the base $\Delta E_b/N_0$ value, the fundamental channel comprises at least 5 communication links and the supplemental channel comprises at least 5 communication links; and wherein the step of adjusting the second power level by the active leg value comprises adjusting the second power level approximately 0.0 decibels.

75. The method in claim 52, wherein the step of determining the base $\Delta E_b/N_0$ value, the fundamental channel comprises at least 6 communication links and the supplemental channel comprises at least 5 communication links; and wherein the step of adjusting the second power level by the active leg value comprises adjusting the second power level approximately 0.0 decibels.

76. The method in claim 52, wherein the step of determining the base $\Delta E_b/N_0$ value, the fundamental channel comprises at least 6 communication links and the supplemental channel comprises at least 6 communication links; and wherein the step of adjusting the second power level by the active leg value comprises adjusting the second power level approximately 0.0 decibels.

77. The method in claim 50, wherein the adjustment of the base $E_b/N_0$ value by a frame error correction value is a function of:

$$\text{Frame Error Correction Value} = FER \text{ Correction Slope} * \log_{10}(FER_{SCH}/FER_{FCH})$$

wherein the FER Correction Slope is a factor to be applied to the ratio of a supplemental frame error rate to a fundamental frame error rate converted to decibels; and wherein the term $\log_{10}(FER_{SCH}/FER_{FCH})$ is the ratio of the supplemental frame error rate to the fundamental frame error rate.

78. The method in claim 77, wherein the FER Correction Slope is approximately −3.3.

79. The method in claim 50, further comprising adjusting the base $E_b/N_0$ value by an error code correction adjustment at least partially offsetting a gain required for a frame error correction method designed into the wireless communications system.

80. The method in claim 79, wherein the frame error correction method comprises use of a convolutional code and wherein the frame error code correction value comprises approximately 0.0 decibels.

81. The method in claim 79, wherein:
the frame error code correction method comprises use of a turbo code;
the transmission of data comprises use of protocols with Radio Configuration 3;
the data transfer rate comprises approximately 19.2 kbps; and
the step of adjusting the second power level by an error code correction adjustment comprises a decrease of power by approximately 0.6 decibels.

82. The method in claim 79, wherein:
the frame error code correction method comprises use of a turbo code;

the transmission of data comprises use of protocols with Radio Configuration 3;

the data transfer rate comprises approximately 38.4 kbps; and the step of adjusting the second power level by an error code correction adjustment comprises a decrease of power by approximately 1.0 decibels.

83. The method in claim 79, wherein:

the frame error code correction method comprises use of a turbo code;

the transmission of data comprises use of protocols with Radio Configuration 3;

the data transfer rate comprises approximately 76.8 kbps; and the step of adjusting the second power level by an error code correction adjustment comprises a decrease of power by approximately 1.2 decibels.

84. The method in claim 79, wherein:

the frame error code correction method comprises use of a turbo code;

the transmission of data comprises use of protocols with Radio Configuration 3;

the data transfer rate comprises approximately 153.6 kbps; and the step of adjusting the second power level by an error code correction adjustment comprises a decrease of power by approximately 1.4 decibels.

85. The method in claim 79, wherein:

the frame error code correction method comprises use of a turbo code;

the transmission of data comprises use of protocols with Radio Configuration 4;

the data transfer rate comprises approximately 19.2 kbps; and the step of adjusting the second power level by an error code correction adjustment comprises a decrease of power by approximately 0.1 decibels.

86. The method in claim 79, wherein:

the frame error code correction method comprises use of a turbo code;

the transmission of data comprises use of protocols with Radio Configuration 4;

the data transfer rate comprises approximately 38.4 kbps; and the step of adjusting the second power level by an error code correction adjustment comprises a decrease of power by approximately 0.5 decibels.

87. The method in claim 79, wherein:

the frame error code correction method comprises use of a turbo code;

the transmission of data comprises use of protocols with Radio Configuration 4;

the data transfer rate comprises approximately 76.8 kbps; and the step of adjusting the second power level by an error code correction adjustment comprises a decrease of power by approximately 0.8 decibels.

88. The method in claim 79, wherein:

the frame error code correction method comprises use of a turbo code;

the transmission of data comprises use of protocols with Radio Configuration 4;

the data transfer rate comprises approximately 153.6 kbps; and the step of adjusting the second power level by an error code correction adjustment comprises a decrease of power by approximately 1.1 decibels.

89. The method in claim 50, further comprising adjusting the base $E_b/N_0$ value by a power control adjustment at least partially offsetting a difference in a first power control of the first data transfer rate and a second power control of the second data transfer rate.

90. The method in claim 89, wherein the first data transfer rate is the data transfer rate of a fundamental channel; wherein the second data transfer rate is the data transfer rate of a supplemental channel; and wherein the power control correction adjustment comprises approximately −1.0 dB.

91. The method in claim 50, wherein the communication links are adjusted to operate over substantially the same spread spectrum.

92. The method in claim 91, wherein the communication links transfer data in a CDMA system.

93. A method of transmitting data in a wireless communications system, the method comprising the steps of:

determining a first power level for transmitting data at a first data transfer rate;

determining an available power level for use in transmitting the data;

if the first power level exceeds the available power level, selecting at least one step from the group consisting of notifying the user of insufficient power, terminating data transmission, and retrying the data transmission at a lower transfer rate; and transmitting the data at the requested data transfer rate if the available power level is at least the first power level.

94. The method in claim 93, wherein if the first power level exceeds the available power level, the method further comprising the steps of:

determining a second data transfer rate for transmitting the data;

determining a second power level for transmitting the data at the second data transfer rate, wherein the second data transfer rate is such that the available power level is at least the second power level; and transmitting the data at the second data transfer rate.

95. The method in claim 93, wherein the available power level is a total amount of power available less an overhead reserve less a currently used power level.

96. The method in claim 93, wherein an overhead reserve is about 25% of a total available power.

97. The method in claim 93, wherein a total amount of power is between about 12 and 18 Watts.

* * * * *

UNITED STATES PATENT AND TRADEMARK OFFICE
CERTIFICATE OF CORRECTION

PATENT NO.   : 6,907,018 B1
DATED        : June 14, 2005
INVENTOR(S)  : David W. Paranchych and Ashvin H. Chheda It is certified that error appears in the above-identified patent and that said Letters Patent is hereby corrected as shown below:

Column 14,
Lines 33 and 46, please delete "$E_b/N_o$" and insert -- $\Delta E_b/N_o$ --.

Column 16,
Line 12, please delete "$E_b/N_o$" and insert -- $\Delta E_b/N_o$ --.

Signed and Sealed this

Eighteenth Day of October, 2005

JON W. DUDAS
*Director of the United States Patent and Trademark Office*